(12) United States Patent
Martinez et al.

(10) Patent No.: US 7,747,841 B2
(45) Date of Patent: Jun. 29, 2010

(54) METHOD AND APPARATUS FOR EARLY LOAD RETIREMENT IN A PROCESSOR SYSTEM

(75) Inventors: Jose F. Martinez, Ithaca, NY (US); Meyrem Kirman, Ithaca, NY (US); Nevin Kirman, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 11/526,568

(22) Filed: Sep. 26, 2006

(65) Prior Publication Data

US 2007/0074006 A1 Mar. 29, 2007

Related U.S. Application Data

(60) Provisional application No. 60/720,048, filed on Sep. 26, 2005.

(51) Int. Cl.
*G06F 9/00* (2006.01)
(52) U.S. Cl. ........................ 712/218; 712/228; 712/225; 712/216
(58) Field of Classification Search ................. 712/218, 712/228, 216, 225
See application file for complete search history.

(56) References Cited

U.S. PATENT DOCUMENTS

| | | | | |
|---|---|---|---|---|
| 6,216,221 B1 * | 4/2001 | Zaidi et al. | ................... | 712/226 |
| 6,986,027 B2 * | 1/2006 | Barowski et al. | ............ | 712/240 |
| 7,114,060 B2 * | 9/2006 | Chaudhry et al. | ............ | 712/219 |
| 7,188,234 B2 * | 3/2007 | Wu et al. | ..................... | 712/225 |
| 7,293,160 B2 * | 11/2007 | Chaudhry et al. | ............ | 712/214 |
| 7,293,163 B2 * | 11/2007 | Caprioli et al. | ............. | 712/218 |
| 2001/0052064 A1 * | 12/2001 | Chaudhry et al. | ........... | 712/225 |
| 2002/0199066 A1 * | 12/2002 | Chaudhry et al. | ........... | 711/141 |
| 2003/0172255 A1 * | 9/2003 | Dundas | ..................... | 712/225 |
| 2004/0078559 A1 * | 4/2004 | Katayama et al. | ........... | 712/239 |
| 2004/0168045 A1 * | 8/2004 | Morris et al. | ............... | 712/225 |
| 2004/0199752 A1 * | 10/2004 | Winberg et al. | ............. | 712/225 |
| 2004/0216001 A1 * | 10/2004 | Kalla et al. | .................... | 714/5 |
| 2004/0230778 A1 * | 11/2004 | Chou et al. | .................. | 712/228 |
| 2006/0149931 A1 * | 7/2006 | Haitham et al. | ............. | 712/218 |

OTHER PUBLICATIONS

Brad Calder, Glenn Reinman "A Comparative Survey of Load Speculation Architectures"; Year: 2000; pp. 1-34.*

(Continued)

*Primary Examiner*—Eddie P Chan
*Assistant Examiner*—Idriss N Alrobaye
(74) *Attorney, Agent, or Firm*—Jones, Tullar & Cooper, PC

(57) ABSTRACT

A technique known as checkpointed early load retirement, combines register checkpointing load-value prediction to manage long-latency loads. When a long-latency load reaches the retirement stage unresolved, the processor enters Clear mode by (1) taking a Checkpoint of the architectural registers, (2) supplying a load-value prediction to consumers, and (3) early-retiring the long-latency load. This unclogs retirement, thereby "clearing the way" for subsequent instructions to retire, and also allowing instructions dependent on the long-latency load to execute sooner. When the actual value returns from memory, it is compared against the prediction. A misprediction causes the processor to roll back to the checkpoint, discarding all subsequent computation.

26 Claims, 3 Drawing Sheets

OTHER PUBLICATIONS

Mutlu, O. Stark, J. Wilkerson, C. Patt, Y.N. "Runahead execution: an alternative to very large instruction windows for out-of-order processors"; Publication Date: Feb. 8-12, 2003; pp. 129-140.*

Onur Mutlu Hyesoon Kim Patt, Y.N. "Techniques for efficient processing in runahead execution engines"; Publication Date: Jun. 4-8, 2005; pp. 370- 381.*

Mutlu, O. Hyesoon Kim Patt, Y.N. "Address-Value Delta (AVD) Prediction: A Hardware Technique for Efficiently Parallelizing Dependent Cache Misses"; Publication Date: Dec. 2006; pp. 1491-1508.*

Mutlu, O. Stark, J. Wilkerson, C. Patt, Y.N. "Runahead execution: An effective alternative to large instruction windows"; Publication Date: Nov.-Dec. 2003; pp. 20-25.*

Ceze, L. Strauss, K. Tuck, J. Renau, J. Torrellas, J. "CAVA: Hiding L2 Misses with Checkpoint-Assisted Value Prediction"; Publication Date: Jan. 2004; pp. 1-4.*

Luis Ceze, Karin Strauss, James Tuck, Josep Torrellas, Jose Renau "CAVA: Using checkpoint-assisted value prediction to hide L2 misses"; Year of Publication: 2006; pp. 182-208.*

Dreslinski, Ron and Karl, Eric, "RunaPred: A Hybrid Runahead/Value Prediction Approach," Electrical Engineering and Computer Science Department, University of Michigan, Ann Arbor, MI, Apr. 18, 2003, 8 pages.*

Martinez, J.F. Renau, J. Huang, M.C. Prvulovic, M. "Cherry: Checkpointed early resource recycling in out-of-order microprocessors"; Publication Date: 2002; pp. 3-14.*

Lebeck, A.R. Koppanalil, J. Tong Li Patwardhan, J. Rotenberg, E. "A large, fast instruction window for tolerating cache misses"; Publication Date: 2002; pp. 59-70.*

Luis Ceze, James Tuck, and Josep Torrellas "Are We Ready for High Memory-Level Parallelism?"; Workshop on Memory Performance Issues (WMPI), Feb. 2006.*

A.R. Lebeck et al, "A Large, Fast Instruction Window for Tolerating Cache Misses," Intl Symposium on Computer Architecture, (p. 59-70), (May 2002).

M.H. Lipasti et al, "Exceeding the Dataflow Limit via Value Prediction," Intl Symposium on Microarchitecture, (p. 226-237), (Dec 1996).

S. Srinivasan et al, "Continual Flow Pipelines," Intl Conference on Architectural Support for Programming Languages and Operating Systems, (p. 107-119), (Oct. 2004).

D.M. Tullsen et al, "Handling Long-Latency Loads in a Simultaneous Multithreading Processor," Intl Symposium on Microarchitecture, (p. 318-327), (Dec. 2001).

H. Zhou et al, "Enhancing Memory Level Parallelism via Recovery-Free Value Prediction," Intl Conference on Supercomputing, (p. 326-335), (Jun. 2003).

N. Tuck et al, "Multithreaded Value Prediction," Intl Symposium on High-Performance Computer Architecture, (p. 5-15), (Feb. 2005).

* cited by examiner

METHOD AND APPARATUS FOR EARLY LOAD RETIREMENT IN A PROCESSOR SYSTEM

CROSS REFERENCE TO RELATED APPLICATIONS

This application claims the benefit, under 35 U.S.C. 119 (e), of U.S. Provisional Application No. 60/720,048, filed Sep. 26, 2005, which is hereby incorporated by reference in its entirety.

GOVERNMENT SPONSORSHIP STATEMENT

This invention was made with government support under National Science Foundation Contract No. CCF-0429992. The government has certain rights in this invention.

BACKGROUND OF THE INVENTION

1. Field of the Invention

The present invention relates in general to a method and apparatus for managing processor load instructions, which combines load value prediction with checkpointed early load retirement to handle long latency and other performance reducing loads more efficiently.

2. Description of the Background Art

Modern processors typically retire instructions in program order. In-order retirement enables precise bookkeeping of the architectural state, effectively making out-of-order execution transparent to the user. When, for example, an instruction raises an exception, the processor continues to retire instructions up to the excepting one. At that point, the processor's architectural state reflects all the updates made by preceding instructions, and none of the updates made by the excepting instruction or its successors. Then, the exception handler is invoked.

In-order retirement also means that an unresolved long latency instruction may remain at the processor's retirement stage for many cycles. This is often the case for loads that miss in the cache hierarchy, whose penalty is already severe in today's processors, and is bound to be worse in future systems due to the increasing processor-memory speed gap. These long latency loads may hinder processor performance mainly in two ways: First, because their results are not available for many cycles, potentially long chains of dependent instructions may be blocked for a long time. Second, because instruction retirement is effectively disabled by these long latency memory operations, executed instructions hold on to critical resources for many cycles. Upon running out of resources, the processor stops fetching new instructions and eventually stalls.

Conventional load-value prediction addresses the first problem by supplying a predicted value on an unresolved load. The prediction can be provided early in the processor pipeline. Dependent instructions may then execute using this prediction. Once the value comes back from memory, it is compared against the predicted value. If they match, the instruction is deemed complete; if they do not, a replay of dependent instructions (and, possibly, all instructions after the load) takes place—this time with the right value.

In practice, however, the effectiveness of conventional load-value prediction is limited by the second problem: Indeed, because the processor must ultimately compare the loaded and the predicted values, unresolved long-latency loads continue to clog the processor at retirement. In other words, the predicted load and all the subsequent instructions in program order remain in the processor, holding precious resources such as physical registers or reorder buffer entries until the load value is verified. If, for example, the load misses in all levels of the local cache hierarchy, this frequently blocks retirement, eventually bringing the processor to a stall. As a result, conventional load-value prediction may not be as effective with this type of loads.

Runahead execution was first used to improve the data cache performance of an in-order execution core. More recently, a Runahead architecture for out of-order processors has been proposed. The architecture "nullifies" and retires a memory operation that misses in the L2 cache and remains unresolved at the time it gets to the ROB head. It also takes a checkpoint of the architectural registers, to be used to come out of Runahead mode when the memory operation completes. The instructions that depend on the nullified operation do not execute, but are nullified in turn, and hence retire quickly. Moreover, any long-latency load encountered during Runahead execution (regardless of its position in the ROB) and its dependence chain are also nullified. Other instructions execute normally, but without overwriting data in memory. When the operation completes, the processor systematically rolls back to the checkpoint and resumes conventional execution. Although execution in Runahead mode is always discarded, it effectively warms up caches and various predictors, thereby speeding up the overall execution.

Experimental results have shown that, for an important number of applications, blocked ROB time accounts for a very significant fraction of the total execution time in a modern out-of-order processor. Worse still, most of this blocked ROB time falls under Blocked-Stall category—that is, the processor is not able to do any work. Moreover, although the addition of a hardware prefetcher helps noticeably in a few cases, in general the problem remains. As the processor-memory speed gap widens, a solution to alleviate the problem of long-latency misses is needed.

SUMMARY OF THE INVENTION

The present invention solves this problem by predicting the outcome of and early retiring loads that take a long time to finish, and using checkpointing to roll back and refetch in case of a misprediction. This technique is referred to as checkpointed early load retirement, which is a mechanism that combines register checkpointing and load-value prediction. When a long-latency load hits the ROB head unresolved, the processor enters Clear mode by (1) taking a checkpoint of the architectural registers, (2) supplying a load-value prediction to consumers, and (3) early-retiring the long-latency load. This unclogs the ROB, thereby "clearing the way" for subsequent instructions to retire, and also allowing instructions dependent on the long-latency load to execute sooner. In Clear mode, subsequent long latency loads that hit the ROB head unresolved are allowed to retire early, similarly supplying a predicted value, and selectively taking checkpoints of the architectural registers based on the confidence of the prediction. Memory updates are buffered until the prediction(s) can be validated, to guarantee data integrity in case of a misprediction. When the actual values return from memory, they are compared against the predictions. A checkpoint is released only if all its early-retired loads are correctly predicted. Otherwise, the processor rolls back to that checkpoint, and all buffered memory updates are discarded.

The advantages of executing in Clear mode come in three ways: (1) on correct predictions, faster progress is achieved by enabling execution and retirement of long-latency loads and subsequent instructions. (2) On wrong predictions, laterto-be-used data and instructions are brought closer to the processor in the memory hierarchy, doing useful prefetching. (3) Different processor predictors are trained regardless of the outcome.

To implement the technique of the present invention, the preferred embodiment is supported by modest hardware that can be incorporated efficiently in the processor. More particularly, the proposed mechanism is disclosed in the context of a contemporary micro-architecture with separate register file, ROB and load/store queues. In order to implement the invention, a number of hardware additions are needed besides checkpointing support. These comprise a load-value predictor (LVP) and three FIFO queues: the prediction queue (PQ), and two other queues coupled with the processor's load queue (LQ)—the data queue (LDQ) and the timestamp queue (LTQ).

The LVP is used to generate predictions for long-latency loads at the ROB head. It is indexed by the load's instruction address. In conventional mode, the LVP is updated (and thus trained) by every load that the processor retires. In Clear mode, as a design choice, certain loads may or may not update the LVP. In the subject implementation, during Clear mode, all retired loads, including early-retired ones, update the LVP. However, early-retired loads do so speculatively with the predicted value. The LVP also incorporates confidence estimation that determines whether confidence on a given prediction is beyond a certain threshold, which is used in checkpoint assignment.

The PQ is a FIFO, content-addressable (CAM) structure. Similarly to a small store queue, it sits on the processor bus and can be looked up by data address. The PQ is used to remember the information associated with early-retired loads. In each entry, it stores the data address, the associated value and its size, and the checkpoint ID. The PQ has three main functions: (1) compare predicted and actual values; (2) forward predicted values to load operations as needed during Clear mode; and (3) identify the associated checkpoint on a load-value return. Once the processor exits Clear mode, the entire PQ is cleared.

The LDQ and the LTQ are two conventional FIFO RAM (but not CAM) structures that extend the processor's existing LQ (a FIFO CAM). Entries in the LQ, the LDQ and the LTQ are allocated at rename and released at commit, in lockstep. LQ entries, as in conventional processors, store effective addresses. LDQ entries store the values loaded by uncommitted load instructions, as returned from memory. They are used to update the LVP in order as load instructions retire. Finally, LTQ entries store timestamps taken at the time loads are issued to the memory system. They are used to help determine if a load should be early retired, at the time it reaches the ROB head.

BRIEF DESCRIPTION OF THE DRAWINGS

The features and advantages of the present invention will become apparent from the following detailed description of a preferred embodiment thereof, taken in conjunction with the accompanying drawings, which are briefly described as follows.

DETAILED DESCRIPTION OF THE PREFERRED EMBODIMENT

I. Overview

Figure 1:
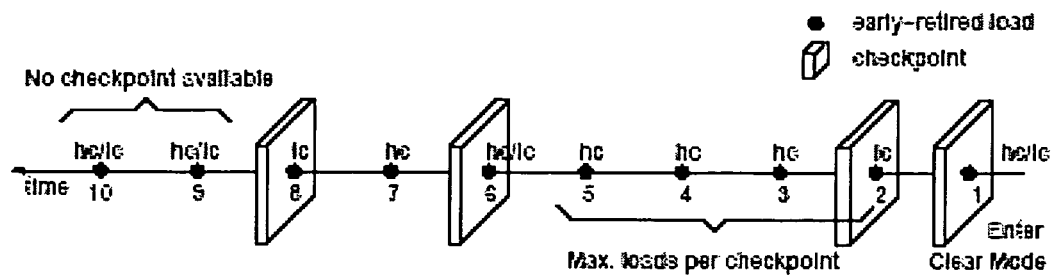
FIG. 1 is a diagrammatic illustration of a checkpoint allocation example.

In the preferred embodiment, the focus is on single-threaded execution, and load-value prediction is combined with selective checkpointing to realize early load retirement. The goal of checkpointed early load retirement is to tolerate long-latency loads by (1) retiring them early, so as to not block the flow of instructions through the processor, and (2) providing their dependent instructions with a predicted value. The mechanism requires modest hardware and interferes minimally with the normal course of operation. The design is in the context of a uniprocessor environment, but it will be understood that the inventive concepts are not limited thereto and could readily be extended to multiprocessor applications.

In operation of the preferred embodiment, an out-of-order processor executing in "conventional mode" eventually comes across a long-latency load that remains at the head of the ROB unresolved. At this point, the processor enters "Clear mode": the load is early retired, and a predicted value is supplied to its destination register. Also, the architectural registers are checkpointed. Checkpointing is a known technique, an example of which is disclosed is US Published Patent Application No. 2004-0230778, published Nov. 18, 2004, which is hereby incorporated by reference in its entirety.

While in Clear mode, if a long-latency load arrives at the ROB head unresolved, the hardware decides whether to take a new checkpoint for this load or to use the running one. (Notice that a realistic implementation cannot afford to have more than a few checkpoints.) To make this decision, the processor assesses the confidence on the prediction for this load. This can be accomplished using some form of confidence estimator. If the load is highly predictable (i.e., confidence is above a threshold) a new checkpoint is not allocated. On the other hand, if the load cannot be predicted with high enough confidence, a new checkpoint is allocated, provided all the checkpoints are not already exhausted.

Notice that attaching too many loads to one checkpoint increases the potential cost of a rollback, because a mispredicted value from any of these loads will trigger a rollback to that checkpoint. Thus, the mechanism also limits the number of loads subject to a particular checkpoint, by taking a new one when the limit is exceeded.

Naturally, only a limited number of checkpoints are supported. To overcome this limitation, once the last available checkpoint is allocated, all long-latency loads that reach the ROB head unresolved are systematically predicted and early retired, and all of them are assigned to the last checkpoint. If many such loads are encountered, the probability of suffering a rollback to that last checkpoint may be high. Yet the prefetching effect of handling these long latency loads in Clear mode may still bring significant benefits. Notice that this unbounded assignment takes place only as long as there is no available checkpoint. After one becomes available, if the limit of the last one is already exceeded, or on a low confidence load, a new checkpoint is allocated. Naturally, due to the finite size of supporting structures, the number of long-latency loads that can be handled in Clear mode is necessarily limited (see Prediction Queue later).

As early-retired loads return, the processor validates the predictions against the actual returned values. A checkpoint is released when (1) it is the oldest active checkpoint, and (2a) either all its loads have been validated, or (2b) any of its loads' validation fails. In the first case, if the released checkpoint was the last one active, the processor smoothly falls back to conventional mode. On the other hand, in the last case, the processor discards the execution after the checkpoint, and uses the checkpoint to restore the architectural state.

FIG. 1 shows an example of this checkpoint allocation policy. In the example, up to four checkpoints are supported, and a maximum of four loads can be assigned to a checkpoint (last checkpoint exempt). High-confidence and low-confidence loads are indicated by hc and lc, respectively, as determined by some confidence estimation of the prediction in each case. The dots on the timeline represent long-latency loads that reach the ROB head unresolved and retire early. On the first such load, regardless of its prediction confidence, always a checkpoint is taken, which initiates Clear mode. The second load, which is regarded as low-confidence, prompts allocation of a second checkpoint. The subsequent high-confidence loads are attached to this second checkpoint, until the limit of four loads per checkpoint is met. Then, on the fifth load from the last allocated checkpoint, a third checkpoint is taken regardless of prediction confidence. Later, on the next low confidence load, a fourth and last checkpoint is allocated. Because there are no more available checkpoints, and in order to not stall execution in Clear mode at this point, subsequent loads, regardless of their prediction confidence, are assigned to this last checkpoint.

Figure 2:
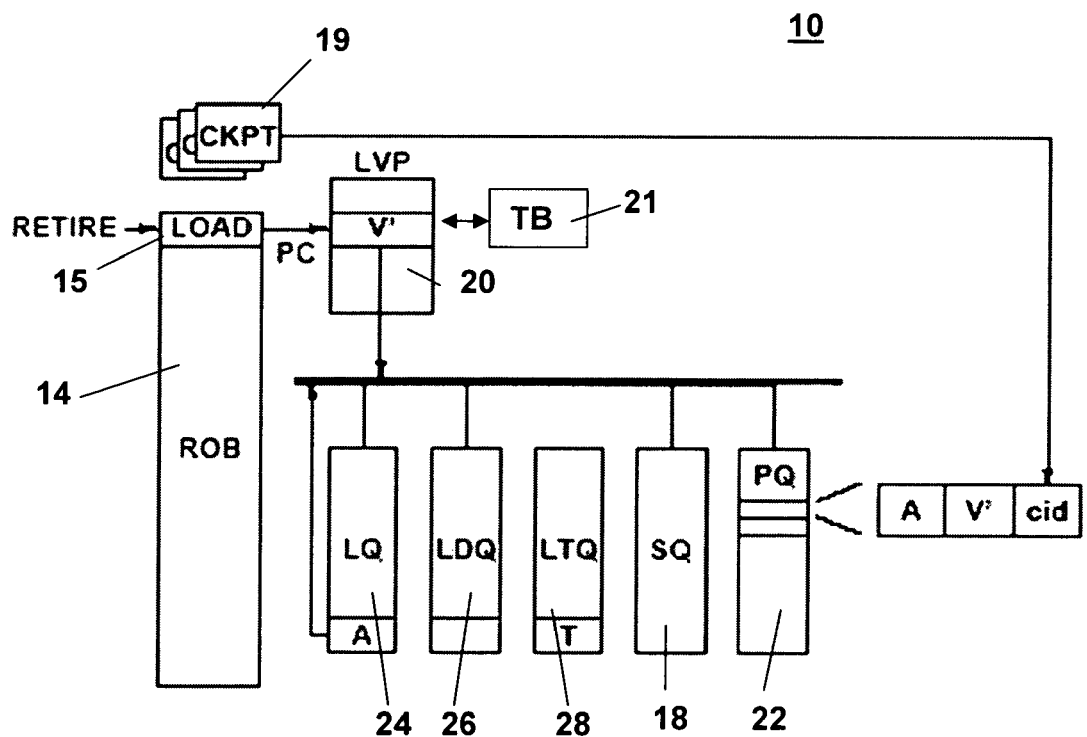
FIG. 2 is a simplified example of a Clear-enabled processor at the time a long-latency load is about to early retire (not drawn to scale).

To implement the technique of the present invention, the preferred embodiment is supported by modest hardware that can be incorporated efficiently in the processor. FIG. 2 illustrates one possible exemplary hardware implementation of the invention. More particularly, the proposed mechanism is disclosed in the context of a contemporary microprocessor architecture 10 with separate register file, ROB 14 including ROB head 15, and load/store queues 16 and 18, respectively. Implementations over micro-architecture variations (e.g., RUU-based processor) are also possible.

II. Hardware Structures

In order to implement the invention, a number of hardware additions are needed besides checkpointing support. Referencing FIG. 2, the example Clear hardware support is shaded. cid, A, T, and V' in this example represent the ID, data address and size of a corresponding checkpoint 19, timestamp associated with the load, which may be used to help determine its condition of "long-latency," and predicted value of the load, respectively. The hardware additions include a load-value predictor (LVP) 20 with an associated temporary buffer 21, and three FIFO queues: the prediction queue (PQ) 22, and two other queues coupled with the processor's load queue (LQ) 24—the data queue (LDQ) 26 and the timestamp queue (LTQ) 28.

1) Load-Value Predictor

The LVP 20 is used to generate predictions for long-latency loads at the ROB head. It is indexed by the load's instruction address. In conventional mode, the LVP 20 is updated (and thus trained) by every load that the processor retires. In Clear mode, as a design choice, certain loads may or may not update the LVP 20. In the subject implementation, during Clear mode, all retired loads, including early-retired ones, update the LVP 20. However, early-retired loads do so speculatively with the predicted value. For simplicity, the hardware does not correct wrong speculative updates.

The LVP 20 also incorporates confidence estimation that determines whether confidence on a given prediction is beyond a certain threshold. As already discussed, this is used in checkpoint assignment. Unlike the LVP update, early-retired loads do not update the confidence estimator.

2) Prediction Queue

The PQ 22 is a FIFO, content-addressable (CAM) structure. Similarly to a small store queue, it sits on the processor bus and can be looked up by data address. The PQ 22 is used to remember the information associated with early-retired loads. In each entry, it stores the data address, the associated value and its size, and the checkpoint ID. The PQ 22 has three main functions: (1) compare predicted and actual values; (2) forward predicted values to load operations as needed during Clear mode; and (3) identify the associated checkpoint on a load-value return. Entries in the PQ 22 are allocated in order every time a new value is predicted. The size of the PQ 22 bounds the maximum number of early-retired loads that can be handled. PQ entries are freed when their corresponding checkpoints are released. Also, once the processor exits Clear mode, the entire PQ 22 is cleared.

3) Load Data and Timestamp Queues

The LDQ 26 and the LTQ 28 are two conventional FIFO RAM (but not CAM) structures that extend the processor's existing LQ 24 (a FIFO CAM). Entries in the LQ 24, the LDQ 26, and the LTQ 28 are allocated at rename and released at commit, in lockstep. LQ entries, as in conventional processors, store effective addresses. LDQ entries store the values loaded by uncommitted load instructions, as returned from memory. They are used to update the LVP 20 in order as load instructions retire. Finally, LTQ entries store timestamps taken at the time loads are issued to the memory system. They are used to help determine if a load should be early retired, at the time it reaches the ROB head.

III. Operation

1) Assessment

Figure 3:
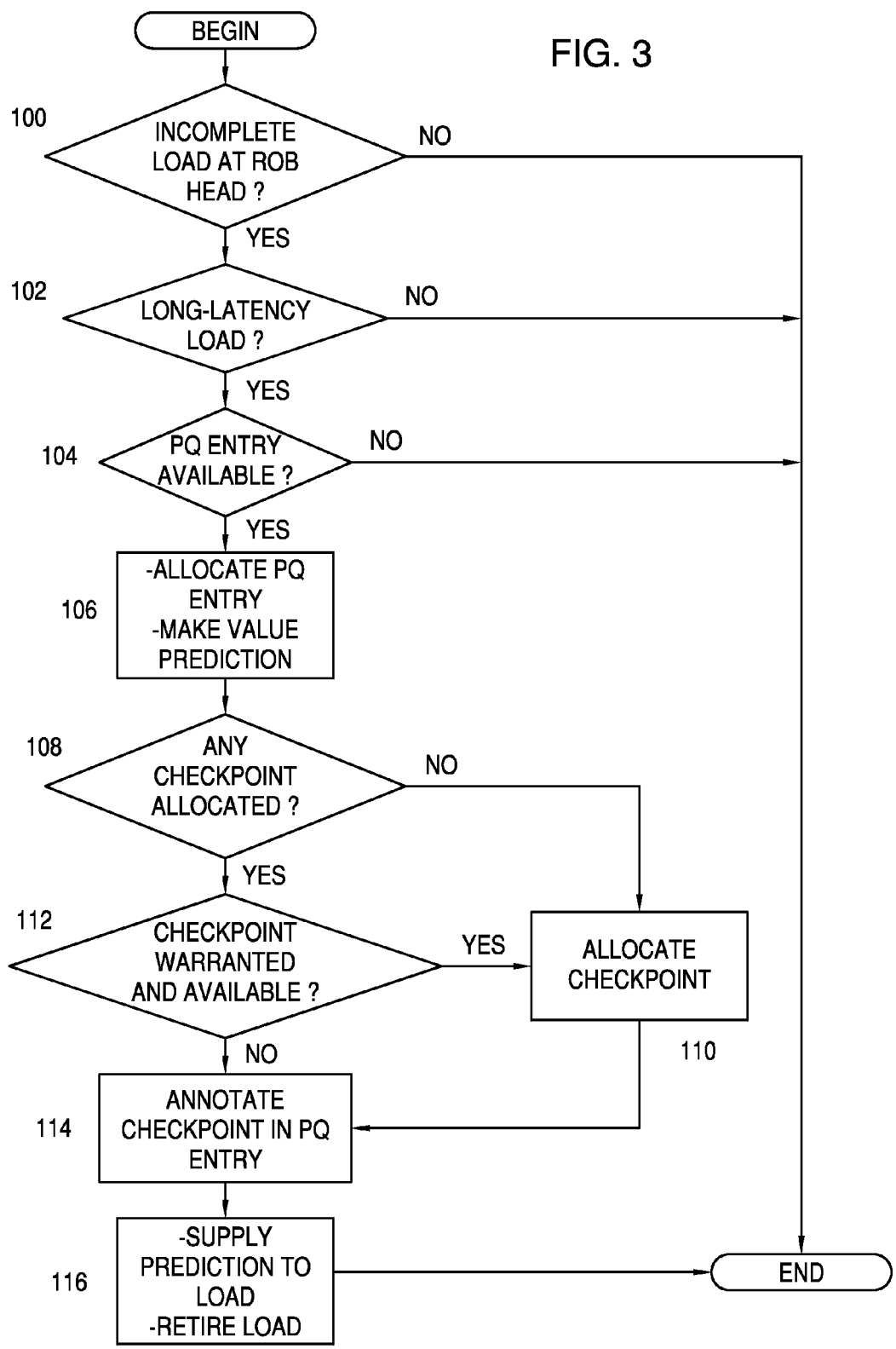
FIG. 3 is a flowchart showing the steps employed in the method of the preferred embodiment of the present invention to determine whether an incomplete load should be retired and a predicted value should be inserted for the load.
Figure 4:
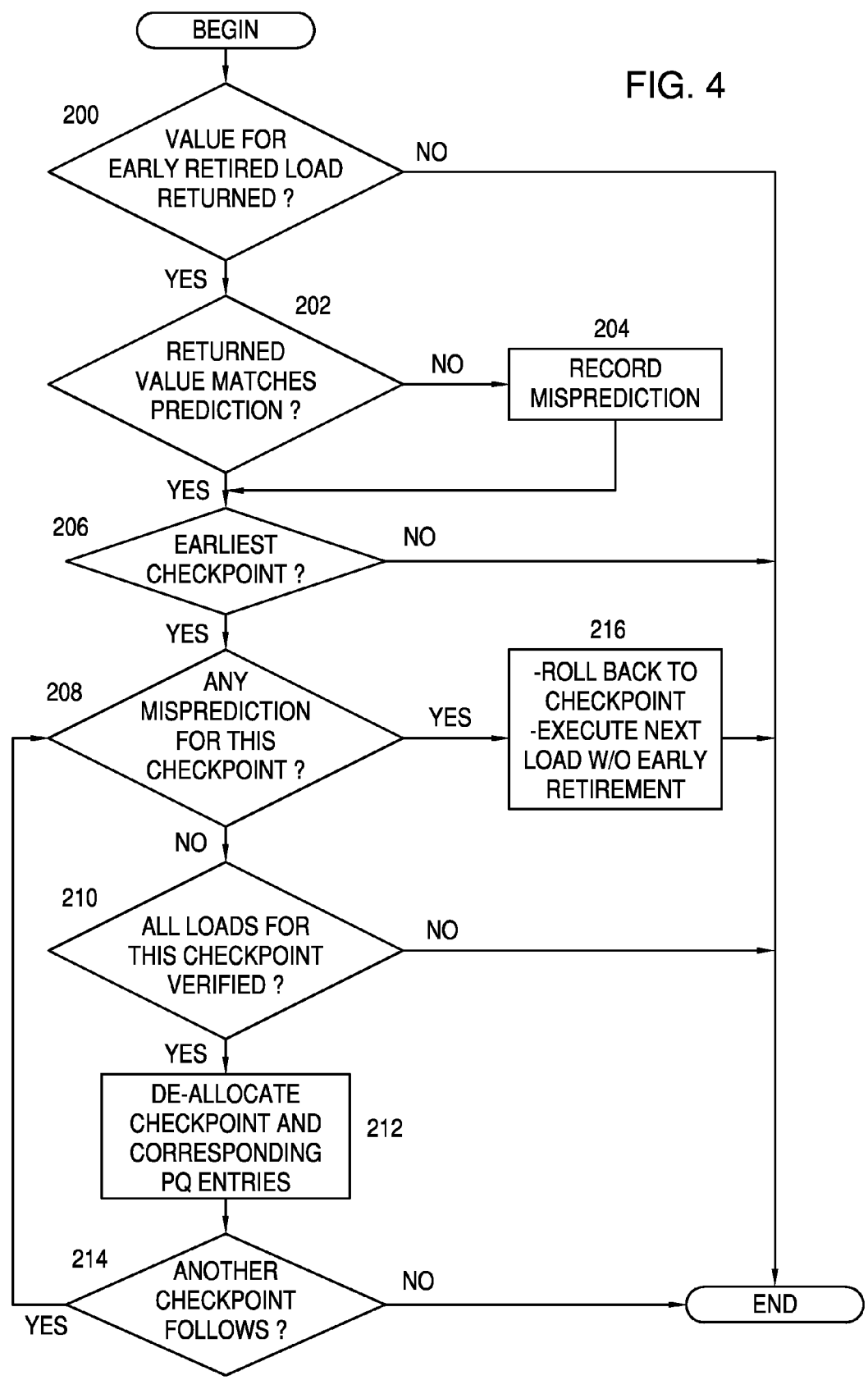
FIG. 4 is a flowchart showing the steps employed in the method of the preferred embodiment of the present invention to determine whether a checkpoint should be released upon return of a value for an early retired load.

The method of operation of the invention is illustrated in the flowcharts of FIGS. 3 and 4. With reference first to FIG. 3, at the time the processor detects that an incomplete load reaches the ROB head 15 at step 100, the processor decides whether to block (as in a conventional processor) or to early retire the load, by determining whether this is a long-latency load at step 102. In addition, in order to be able to retire the load early, there must be a PQ entry available, so this is determined next at step 104. Unless the answer to both queries is affirmative, the processor continues processing the load in the conventional manner by waiting for the load's value to be returned from memory.

To determine whether load has a long-latency at step 102, the processor must estimate the expected response time from memory for the load. This can be accomplished in several ways. One simple way is to count the number of cycles the load stays at the ROB head 15, and early retire it if it remains incomplete after a fixed number of cycles. This can often be inaccurate, but it is very easy to implement.

A more accurate estimation is possible using LTQ support. In a typical processor, at the time the effective address of a load is calculated (shortly before the cache access is started in the processor pipeline), its LQ entry is indexed and filled with the address. In the subject architecture, at that time, the corresponding LTQ entry is also accessed and filled with a timestamp. This timestamp corresponds, more or less, with the time at which the load issues to the memory system.

At the time an incomplete load hits the ROB head 15 and becomes a candidate for early retirement, the processor inspects its timestamp (necessarily at the LTQ head). From the time elapsed since the load issued, the processor may determine, for example, that the load has just missed in L2. In such a case, the load may be a good candidate for early retirement. Note that, if it is determined that the load has issued only recently, the processor can continue monitoring the elapsed time until it enters L2 miss territory. Naturally, the processor must be aware of the approximate latencies of the memory hierarchy. This characterization can be easily accomplished, for example by running a short microbenchmark by the operating system at startup.

The timestamp need only be large enough to cover a worst-case round-trip to memory. In this way, no more than one wrap-around can be experienced by any one load that hits the ROB head and is still marked incomplete. Of course, the timestamp is ignored for completed loads. In any case, occasional inaccuracies in the mechanism would never affect correctness.

Overall, the processor can determine inexpensively if a particular load is eligible for early retirement.

2) Value Prediction and Speculative Retirement

During the next step 106 (or more accurately steps), the processor makes a load predication and allocates a PQ entry. At the time an unfinished load hits the ROB head 15, in parallel to assessing whether to early retire it, the processor makes a prediction of the load instruction's return value, by indexing the LVP 20 with the instruction address (normally available at the ROB head, for example, to support restartable exceptions). The processor stores this prediction in the temporary buffer 21, to be used if the load is ultimately early retired. If the processor decides to early retire the load, a PQ entry is allocated in FIFO order and filled as follows: The effective address is supplied by the corresponding LQ entry (necessarily at the head); the value is provided by the LVP's temporary buffer 21; and the ID of appropriate checkpoint is recorded. FIG. 2 depicts this process.

3) Checkpointing

As already discussed, the checkpoint allocation policy is based in part on the confidence of the load value predictions. Once the processor determines that the incomplete load is to be retired, the processor determines at step 108 whether a checkpoint has already been allocated for a previously retired load that has not been released yet (i.e. the processor is already in Clear mode). If not, then at step 110, a checkpoint is allocated. If yes, then a determination is made at step 112 in accordance with the previous discussions regarding FIG. 2, whether a new checkpoint should be allocated (i.e. is warranted and available). If so, the check point is allocated. Whether a checkpoint is allocated or not, the next step 114 is to annotate the PQ entry for the latest checkpoint. Finally, at step 116, the predicted value is supplied to the destination register and the load is retired.

Checkpointing the architectural registers and restoring from a checkpoint can be done in a handful of cycles, insignificant relative to long memory latencies. A checkpoint can be acquired in several ways. One option is to keep an up-to-date shadow copy of the architectural registers during normal operation. With this option, the processor takes a checkpoint by simply freezing the shadow copy. Alternatively, the processor can explicitly copy the architectural values into the shadow register file at the time of the checkpoint. In either case, on a rollback, the architectural registers are restored using the shadow copy. A third option is to simply back up the retirement register alias table. On a rollback, the rename alias table is restored using this backup copy. This option is probably fastest, but it pins the physical registers that contain the checkpointed architectural values for the lifetime of the checkpoint. Other implementations may be possible.

In general, the decision of which mechanism to use depends on factors such as how many architectural registers the ISA has, how many physical registers exist in the processor, or how often checkpoints are taken. Nevertheless, the preferred embodiment of the invention can work with any of them. Further discussion of the details behind register checkpointing is outside the scope of this description of a preferred embodiment.

The following information must be kept for every checkpoint in order to monitor its state: (1) The number of early retired loads associated with the checkpoint, and the number of such loads that have been validated, for a total of two counters. Thus, at the time a load is early retired, its checkpoint's first counter is incremented. In the subject implementation, bounded by the size of the PQ 22 (48), six-bit counters are enough. (2) Whether any of the checkpoint's loads is mispredicted (one bit). This bit is set on a misprediction on any of its loads. When an early-retired load's value returns from memory, it updates the corresponding checkpoint using the checkpoint ID in its PQ entry. In addition to the architectural registers, checkpoints of the global branch history register and return address stack (RAS) are also taken for performance reasons.

4) Speculative State

While the processor is operating in Clear mode, memory updates must be held off to prevent overwriting data that may be needed after a rollback. At the same time, these buffered updates must be available to subsequent loads. There have been a number of proposals to temporarily buffer updates following a processor checkpoint. Conceptually speaking, they can all be made to work similarly. The principle can be explained using an extended store buffer.

While in Clear mode, store buffer entries are tagged with the ID of the checkpoint active at the time the corresponding store retires. Tagged entries are not allowed to leak out to memory. If the processor rolls back to a checkpoint—necessarily the earliest one in this preferred embodiment—all tagged entries are gang-invalidated. If, on the other hand, the processor releases the checkpoint successfully, the tags of the entries belonging to that checkpoint are gang-cleared, and the buffered updates can lazily percolate to memory.

To support this, an additional tag field is required for each store buffer entry. Also, to hold the speculative updates, the size of the store buffer needs to be larger than usual. To have a fast but large enough buffer, a hierarchical store buffer can be used.

Note that, although speculative memory updates are not allowed to modify the memory state, prefetch requests for store addresses can be sent down the memory system. In the case of filling the buffer completely with updates while in Clear mode, on a subsequent update the processor can simply stall and wait for entries to become available, as checkpoints are released and their associated updates leak to memory.

5) Verification and Release of the Checkpoints

The flowchart of FIG. 4 illustrates the steps carried out during verification and release of the checkpoints which ultimately will return the processor to the conventional processing mode. When the memory system returns the value for an early retired load and this is detected by the PQ 22 at step 200, the processor compares the predicted and the actual values at step 202. To accomplish that, the PQ 22 snoops the address every time a memory refill comes in, much like the LQ 24 may do.

At the time the cache controller dumps on the bus the data address and the actual value of an early-retired load, the PQ 22 picks up the pair, finds the matching entry, and compares the predicted and the actual values. Using the checkpoint ID in the PQ entry, the checkpoint's validated load counter is increased, and the misprediction bit is set at step 204 if the prediction is wrong.

Whereas in a conventional load the returned value would be delivered to the load's destination register or instruction, because here the predicted value has already been supplied, this step is not needed.

Every time verification occurs, the checkpoints are considered for release in order, beginning from the earliest active checkpoint in the processor at step 206. If the misprediction bit is unset at step 208, and if all the loads for that checkpoint have now returned from memory at step 210, then the checkpoint and the corresponding PQ entries are de-allocated or released at step 212. That is, the checkpoint is discarded and the tags of the store buffer entries that match that checkpoint's ID are gang-cleared. If at step 210, it is determined that all load values for the checkpoint have not been returned yet, then the process returns to step 200 to wait for return of the next early retired load. The next active checkpoint then undergoes the same procedure at step 214. If this is the last checkpoint, the processor returns to conventional mode.

If, on the other hand, the misprediction bit of the checkpoint is set at step 208, a rollback is triggered to the checkpoint at step 216. On a rollback, the pipeline is flushed, the architectural state is restored using the checkpoint, all checkpoints are released, and all tagged entries in the store buffer (regardless of ID) are gang-invalidated. Then, the processor returns to conventional mode. To guarantee forward progress, the load instruction to which the processor rolls back is marked as not eligible for early retirement, in case that it misses again in the cache hierarchy.

Finally, if the checkpoint considered for release does not meet any of the above conditions, then no action is taken, and no subsequent checkpoint is considered for release until the next verification.

6) Multiple Loads

It is possible that there be a load issued subsequently to a memory location that is covered by a previous early-retired load. There are two possible cases: On the one hand, there may be an intervening store that could satisfy the load's request, in which case the store buffer can forward the value. On the other hand, there may be no such intervening store, or there may be stores with unresolved addresses that the second load bypasses speculatively, if the processor supports such behavior. In these cases, the PQ 22 forwards the predicted value when the load issues.

Of course, if the load is issued before the earlier load has been early retired, there is no predicted value to be forwarded (yet). However, this load has a second chance to receive the predicted value, at the time it reaches the ROB head. At that point, the PQ 22 is inspected using the address at the LQ head, and the matching entry forwards the value. No new PQ entry is allocated for this early-retiring load.

It is also possible that there be a load to the same cache line as a predicted load, but that accesses a different word or subword. Again, there are two possible cases: On the one hand, there may be a buffered store that covers the load's request, in which case the store buffer can forward the value. On the other hand, there may be no such buffered store. In this case, should this second load reach the ROB head incomplete, it may be eligible for early retirement. If so, the allocation of a new PQ entry and the other actions involved are no different from what we explain above.

When a refill comes, the PQ 22 checks for early retired loads not only matching the refill address exactly, but also for other early retired loads that access different words or subwords of the same cache line. On a match, the PQ "replays" the loads in this second group, so that they can pick the actual values from the cache, for comparison with the predicted ones.

7) Mispredictions, Exceptions and Interrupts

In general, conventional speculative execution (e.g., branch prediction or speculative loads) is not affected by the subject invention and mispredictions can be handled as in a conventional processor. Notice that, because a load is at the ROB head at the time early retirement takes place, it is not subject to such conventional speculative mechanisms. Furthermore, because the load must issue to the memory system before being considered for early retirement, any exception on the address calculation, address range, or page access would be caught properly.

If the processor receives an (asynchronous) interrupt while in Clear mode (e.g., an I/O request, or a quantum expiration in a multiprogrammed environment), it can handle it by stalling and waiting to revert to normal mode, either successfully or by rollback. This is also the approach in the case of operations that are irreversible or that have potential side effects, such as non-cacheable memory operations or system calls. In the case of time-sensitive interrupts, it is always possible to flush the pipeline and use the earliest checkpoint as the state to save (and return to after the interrupt). After servicing the interrupt, the processor may even inhibit Clear mode for a short period of time to guarantee progress. Of course, Clear mode could always be disabled by the programmer in time-sensitive situations, for example by using a library call.

IV. Variations and Modifications

It should be understood that the invention is not limited to the foregoing preferred embodiment thereof and that numerous variations and modifications of the hardware and its operation could be made. Examples of such variations and modifications include the following.

Early retired loads can be not only L2 miss loads, but any kind of "long-latency" load, whose latency is deemed likely to cause a clog at retirement. There are two basic events that surround loads of interest: (1) whether they are likely to cause a clog at retirement, and (2) whether they are considered to be long-latency. For example: A value could be predicted and supplied once a load falls into the "long-latency" category, even if such load is still not the oldest instruction in the processor, and only be early retired if the load subsequently becomes the oldest and reaches retirement without having been resolved. Alternatively, a value could be predicted and supplied for an unresolved load without regard of whether this load is long-latency or not, and the load might later become eligible for early retirement upon reaching the retirement stage unresolved.

If the load is resolved before it hits the ROB head, it can generally be dealt with using mechanisms described by others (e.g., replay or refetch) without resorting to a checkpoint. The important thing in all cases for the purposes of this invention is that a checkpoint can be taken if the unresolved load does hit the ROB head and is selected for early retirement. If "long-latency" is a requirement, it can be measured in different ways: Counting the number of cycles the load remains at the ROB head; using the proposed LTQ support; using a signal from the memory system that indicates whether that particular load has become long-latency; etc.

The specific form of the value predictor is not critical—the prediction could be made in any reasonable way, as could be the confidence estimation of such predictions if needed.

The number of checkpoints can be any value greater or equal to one. In case of multiple checkpoints, various checkpoint assignment policies can be applied. A policy as stated in the preferred embodiment is one possible solution (assigning checkpoints, if there is at least one available, to low-confidence early-retired loads, or when the limit of the number of loads assigned to a checkpoint is exceeded). Another way is to allocate a checkpoint when a certain limit of loads per checkpoint is exceeded, regardless of the confidence. In that case, confidence can be dealt with in two ways: (1) ignoring it, or (2) disabling early release when a low-confidence load is being decided upon.

In case all the checkpoints are exhausted, one can continue early retirement but attaching all subsequent early-retired loads to the last checkpoint, and stopping early retirement of loads at some point (e.g., after zero loads, or after a low-confidence load is found, or once PQ resources are exhausted, etc.), until a checkpoint becomes available.

The checkpoint release policy can be in order or out of order. In any case, the conditions for successfully releasing a checkpoint are the same, that is, having all its loads returned and all of them verified to be correctly predicted. Otherwise, if there is a misprediction in any of its loads rollback is triggered. The particular time of the rollback can be either at the time the misprediction is detected or at the time all its loads have returned, or when at least its first load has returned, etc.

In the case of out-of-order checkpoint release, the freed (intermediate) PQ entries can be filled by collapsing or can be left empty or later reassigned to another early-retired load. Finally, the buffered updates whose tag coincides with the released checkpoint must remain in the store buffer and leak to memory only when all prior stores (possibly linked to earlier checkpoints which may be pending release) have done so according to the release mechanism described.

V. Conclusions

The subject inventive technique known as checkpointed early retirement uses what is referred to as the Clear mode of execution. It allows instruction retirement to resume and dependent instructions to execute sooner, thereby reducing processor stalls. When the long-latency load completes, the returned value is compared against the prediction. On a correct prediction, execution in Clear mode is deemed correct and the checkpoint is released. On a misprediction, execution in Clear mode is rolled back and the processor reverts to the checkpointed state. Nevertheless, in that case, instructions executed in Clear mode may have a prefetching effect on instructions and data. Finally, regardless of the prediction outcome, the different predictors in the processor are trained by executing in Clear mode.

The invention represents a general solution that supports multiple checkpoints and multiple early-retired loads per checkpoint. The invention generally requires modest hardware additions on top of a conventional processor. In particular, it does not require upsizing the register file, or the instruction queues.

Detailed simulations of the preferred embodiment revealed that, compared to a state-of-the-art baseline architecture with an aggressive hardware prefetcher, the subject invention achieves important speedups for a set of integer and floating-point applications. It was found that the prefetching benefits of squashed execution in Clear mode are important for many applications, for which predictability of early retired loads is limited. When compared against Runahead execution, the subject invention significantly outperforms it (5% speedup or higher) in five out of six applications. Overall, the subject invention constitutes an effective way to confront the growing disparity of processor and memory speeds.

Although the invention has been disclosed in terms of a preferred embodiment and variations thereon, it will be understood that numerous additional modifications and variations could be made thereto without departing from the scope of the invention as defined in the following claims.

The invention claimed is:

1. A method for processing an executable program and data associated therewith, which are fetched from at least one memory by a processor for execution, said method comprising the steps of:
    identifying a fetched load instruction in said program as being a long latency load instruction if said processor has requested a true value for said load instruction from said memory, but has not obtained a true value from said memory after a predetermined amount of time;
    supplying a prediction value for said long latency load instruction to said processor;
    generating a checkpoint to facilitate returning an execution state of said program and its associated data to that of a point in the program's execution where said long latency load instruction was to be processed;
    allowing said long latency load instruction to retire prior to obtaining said true value for said long latency load instruction from said memory;
    continuing execution of said program using said prediction value for said long latency load instruction, while at the same time preventing application to said memory of any memory updates by any store instructions that follow said long latency load instruction in program order, thereby preventing overwriting of data in said memory associated with said checkpoint;
    when said true value is actually returned from said memory for said long latency load instruction, comparing said true value to said prediction value;
    if said true and prediction values do not match, employing said checkpoint to restore the execution state of said program and its associated data to the point in the program's execution where said long latency load instruction was to be processed, discarding said memory updates, and to restart execution at said point, supplying the true value to said long latency load instruction to said processor; and
    if said true and prediction values do match, releasing said checkpoint, allowing said memory updates to be applied to said memory and continuing execution of said program with said processor.

2. The method of claim 1, wherein if said processor has not returned a true value from said memory for a second load instruction in said program before a true value of said retired long latency load instruction is determined, then a second prediction value is used for said second load instruction and said second load instruction is also allowed to retire.

3. The method of claim 2, wherein if the true value of said first load instruction does not match said prediction value or if the true value of the second load instruction does not match the second prediction value, the processing of said sequence is rolled back to said checkpoint and restarted using the true value of said first load instruction.

4. The method of claim 2, wherein a second checkpoint is generated when said second load instruction is retired.

5. The method of claim 2, wherein a second checkpoint is generated when said second load instruction is retired if a confidence value for the prediction value of said second load instruction does not exceed a threshold.

6. The method of claim 1, wherein if a fetched load instruction is identified as being long latency before being processed by said processor, and if the long latency load instruction remains unresolved when said long latency load instruction becomes the oldest fetched instruction that is yet to be retired by said processor, the long latency load instruction is retired and said prediction value of said long latency load instruction is employed.

7. The method of claim 6, wherein a reorder buffer is provided and if a load instruction is identified as being long latency before being processed by said processor, and if the long latency load instruction remains unresolved when said long latency load instruction reaches a head of said reorder buffer, the long latency load instruction is retired and said prediction value of said long latency load instruction is employed.

8. A method for processing an executable program and data associated therewith, which are fetched from at least one memory by a processor for execution, said method comprising the steps of:
identifying a fetched load instruction in said program as being a long latency load instruction if said processor has requested a true value for said load instruction from said at least one memory, but has not obtained a true value from said at least one memory after a predetermined amount of time;
supplying a prediction value for said long latency load instruction to said processor;
generating a checkpoint to facilitate returning an execution state of said program and its associated data to that of a point in the program's execution where said long latency load instruction was to be processed;
allowing said long latency load instruction to retire prior to obtaining said true value for said long latency load instruction from said memory when said long latency load instruction becomes the oldest fetched instruction yet to be retired by said processor;
continuing execution of said program using said prediction value for said long latency load instruction;
when said true value is actually returned from said memory for said long latency load instruction, comparing said true value to said prediction value;
if said true and prediction values do not match, employing said checkpoint to restore the execution state of said program and its associated data to the point in the program's execution where said long latency load instruction was to be processed and to restart execution at said point, supplying the true value to said long latency load instruction to said processor; and
if said true and prediction values do match, releasing said checkpoint and continuing execution of said program with said processor.

9. The method of claim 8, wherein if said processor has not returned a true value from said memory for a second load instruction in said program before a true value of said retired long latency load instruction is determined, then a second prediction value is used for said second load instruction and said second load instruction is also allowed to retire.

10. The method of claim 9, wherein if the true value of said first load instruction does not match said prediction value or if the true value of the second load instruction does not match the second prediction value, the processing of said sequence is rolled back to said checkpoint and restarted using the true value of said first load instruction.

11. The method of claim 9, wherein a second checkpoint is generated when said second load instruction is retired.

12. The method of claim 9, wherein a second checkpoint is generated when said second load instruction is retired if a confidence value for the prediction value of said second load instruction does not exceed a threshold.

13. The method of claim 8, wherein a reorder buffer is provided and if a load instruction is identified as being long latency before being processed by said processor, and if the long latency load instruction remains unresolved when said long latency load instruction reaches a head of said reorder buffer, the long latency load instruction is retired and said prediction value of said long latency load instruction is employed.

14. A computer system for processing an executable program and data associated therewith comprising:
a processor;
at least one memory for storing said program and said data associated therewith;
a load-value predictor for generating and supplying to said processor a prediction value for any fetched load instruction in said program which is identified as being a long latency load instruction if said processor has requested a true value for said load instruction from said memory, but has not obtained a true value from said memory after a predetermined amount of time;
means for generating a checkpoint to facilitate returning an execution state of said program and its associated data to that of a point in the program's execution where said long latency load instruction was to be processed;
means for early-retiring said long latency load instruction prior to obtaining said true value for said long latency load instruction from said memory and continuing execution of said program using said prediction value for said long latency load instruction, while at the same time preventing application to said memory of any memory updates by any store instructions in said program that follow said long latency load instruction in program order, thereby preventing overwriting of data in said memory associated with said checkpoint;
means for comparing a true value, when said true value is actually returned from said memory for said long latency load instruction, to said prediction value and if said true and prediction values do not match, employing said checkpoint to restore the execution state of said program and its associated data to the point in the program's execution where said long latency load instruction was to be processed, discarding said memory updates, and to restart execution at said point, supplying the true value to said long latency load instruction to said processor; and if said true and prediction values do match, releasing said checkpoint, allowing said memory updates to be applied to said memory, and continuing execution of said program with said processor.

15. The computer system of claim 14, wherein if said processor has not returned a true value from said memory for a second load instruction in said program before a true value of said retired long latency load instruction is determined, then a second prediction value is used for said second load instruction and said second load instruction is also allowed to retire.

16. The computer system of claim 15, wherein if the true value of said first load instruction does not match said prediction value or if the true value of the second load instruction does not match the second prediction value, the processing of said sequence is rolled back to said checkpoint and restarted using the true value of said first load instruction.

17. The computer system of claim 15, wherein a second checkpoint is generated when said second load instruction is retired.

18. The computer system of claim 15, wherein a second checkpoint is generated when said second load instruction is retired if a confidence value for the prediction value of said second load instruction does not exceed a threshold.

19. The computer system of claim 14, wherein if a fetched load instruction is identified as being long latency before being processed by said processor, and if the long latency load instruction remains unresolved when said long latency load instruction becomes the oldest fetched instruction that is yet to be retired by said processor, the long latency load instruction is retired and said prediction value of said long latency load instruction is employed.

20. The computer system of claim 19, further comprising a reorder buffer and if a load instruction is identified as being long latency before being processed by said processor, and if the long latency load instruction remains unresolved when said long latency load instruction reaches a head of said reorder buffer, the long latency load instruction is retired and said prediction value of said long latency load instruction is employed.

21. A computer system for processing an executable program and data associated therewith comprising:
   a processor;
   at least one memory for storing said program and said data associated therewith;
   a load-value predictor for generating and supplying to said processor a prediction value for any fetched load instruction in said program which is identified as being a long latency load instruction if said processor has requested a true value for said load instruction from said memory, but has not obtained a true value from said memory after a predetermined amount of time;
   means for generating a checkpoint to facilitate returning an execution state of said program and its associated data to that of a point in the program's execution where said long latency load instruction was to be processed;
   means for early-retiring said long latency load instruction prior to obtaining said true value for said long latency load instruction from said memory when said long latency load instruction becomes the oldest fetched instruction yet to be retired by said processor and continuing execution of said program using said prediction value for said long latency load instruction; and
   means for comparing a true value, when said true value is actually returned from said memory for said long latency load instruction, to said prediction value and if said true and prediction values do not match, employing said checkpoint to restore the execution state of said program and its associated data to the point in the program's execution where said long latency load instruction was to be processed and to restart execution at said point, supplying the true value to said long latency load instruction to said processor; and if said true and prediction values do match, releasing said checkpoint and continuing execution of said program with said processor.

22. The computer system of claim 21, wherein if said processor has not returned a true value from said memory for a second load instruction in said program before a true value of said retired long latency load instruction is determined, then a second prediction value is used for said second load instruction and said second load instruction is also allowed to retire.

23. The computer system of claim 22, wherein if the true value of said first load instruction does not match said prediction value or if the true value of the second load instruction does not match the second prediction value, the processing of said sequence is rolled back to said checkpoint and restarted using the true value of said first load instruction.

24. The computer system of claim 22, wherein a second checkpoint is generated when said second load instruction is retired.

25. The computer system of claim 22, wherein a second checkpoint is generated when said second load instruction is retired if a confidence value for the prediction value of said second load instruction does not exceed a threshold.

26. The computer system of claim 21, further comprising a reorder buffer and if a load instruction is identified as being long latency before being processed by said processor, and if the long latency load instruction remains unresolved when said long latency load instruction reaches a head of said reorder buffer, the long latency load instruction is retired and said prediction value of said long latency load instruction is employed.

* * * * *

UNITED STATES PATENT AND TRADEMARK OFFICE
CERTIFICATE OF CORRECTION

| | | |
|---|---|---|
| PATENT NO. | : 7,747,841 B2 | Page 1 of 1 |
| APPLICATION NO. | : 11/526568 | |
| DATED | : June 29, 2010 | |
| INVENTOR(S) | : Jose F Martinez et al. | |

It is certified that error appears in the above-identified patent and that said Letters Patent is hereby corrected as shown below:

In the Specification

Column 1, line 16, change "CCF-0429992" to -- CCF-0429922 --.

Signed and Sealed this
Twenty-fourth Day of March, 2015

Michelle K. Lee
*Director of the United States Patent and Trademark Office*